106-88

United States Patent Office 3,138,472
Patented June 23, 1964

---

3,138,472
METHOD FOR MAKING FOAMED
MAGNESIA CEMENT
Alois Sommer, Industriestrasse 125, Hamburg-
Wilhelmsburg, Germany
No Drawing. Filed Oct. 4, 1961, Ser. No. 142,758
Claims priority, application Germany Mar. 9, 1955
17 Claims. (Cl. 106—88)

The present invention relates to methods for making foamed magnesia cement, more particularly of the magnesium oxychloride or magnesium oxysulphate type.

It is an object of the present invention to provide methods for making foamed magnesia cements that will be unusually light in weight and thus have unusually good acoustic and thermal-insulating properties, but which at the same time will be highly water resistant.

Another object of the present invention is the provision of methods for making foamed magnesia cements in which a stable, light foam is maintained up to the time of setting without appreciable collapse of the foam.

Still another object of the present invention is the provision of foamed magnesia cements requiring less water for their preparation than it had heretofore been possible to use.

Finally, it is an object of the present invention to provide methods for making foamed magnesia cements, which will be quick, easy, inexpensive and reliable to practice so as to produce a product of uniformly high quality.

Other objects and advantages of the present invention will become apparent from a consideration of the following description:

Very broadly stated, the present invention is the discovery that the above objects can be achieved by foaming an aqueous dispersion of bitumen, and then, after the foam is fully formed, stirring magnesium oxide into the formed stable foam, and preferably also a filler. The heart of the invention is the addition of magnesium oxide after formation of the foam, the foam being formed from an aqueous dispersion of bitumen so that the bitumen performs the unique dual function of forming the lattice of a stable foam that does not collapse upon subsequent admixture of magnesium oxide, and also rendering the product unexpectedly waterproof upon setting. The chloride or sulphate is incorporated in the mixture either before or after foaming and is in the form of a water-soluble salt of a bivalent metal such as iron, magnesium or zinc. These various ingredients and their proportions will be discussed in greater detail as follows:

BITUMEN

This ingredient of the invention is commonly commercially supplied in the form of an aqueous emulsion containing about 55% by weight of bitumen, and this emulsion is quite suitable for the use in forming an aqueous dispersion of bitumen in the present invention. The emulsion is mixed with water until the bitumen is present in an amount based on the weight of the water of preferably about 1–30%, more preferably about 10%. Based on the weight of magnesium oxide subsequently added, which will be used hereinafter as the principal standard for weight basis in the present invention, the bitumen is present in an amount preferably about 1–20% by weight of the magnesium oxide, more preferably about 6–7% by weight.

FOAMING AGENT

Any of a variety of foaming agents can be used, for example alkylarylsulphonates such as ammonium salts of alkylarylsulphonic acids. Preferably, foaming agents are ammonium salts of alkylnaphthalene sulphonic acids in which the alkyl groups contain hydrocarbon chains having 4–10 carbon atoms, e.g. ammonium butylnaphthalene sulphonate. Preferably, a stabilizer is also used with the foaming agent, and this is preferably a polyacrylic acid ester, for example, polymethylmethacrylate. A suitable foaming agent is therefore, for example, 55% of the foaming agent and 45% of the stabilizer.

The foaming agent is present in the aqueous mixture to be foamed in a concentration of preferably about 3–4.5% by weight of the water. Based on the weight of the magnesium oxide, the preferred range of foaming agent is about 2–3% by weight, more preferably about 2.5% by weight. It will thus be noted that the bitumen is preferably present in the aqueous dispersion to be foamed in a quantity about three times the weight of the foaming agent.

SULPHATE OR CHLORIDE

The sulphate or chloride is a water-soluble salt of a bivalent metal such as iron, magnesium, or zinc. Ferrous sulphate is preferred, for it imparts a particularly high hardness to the product and also greatly reduces rusting of nails and other iron fasteners in contact with the hardened product, but magnesium chloride is also very suitable, as are magnesium sulphate, ferrous chloride, zinc sulphate and zinc chloride.

The salt is used in aqueous solution, and may conveniently be introduced in 20–24° Bé. solution. The salt should be used in a quantity preferably about 20–60% by weight of the magnesium oxide on the basis of dry salt. The more preferred percentage is about 30% by weight of the magnesium oxide.

MAGNESIUM OXIDE

This material, the principal ingredient of the cement proper, is derived from burned magnesite, which is magnesium carbonate, by heating to the neighborhood of 1500° F. Either crystalline or amorphous magnesia or their mixtures can be used. Crystalline magnesia sets somewhat slower but is more durable and offers greater toughness and elasticity. The magnesia can be added dry or in aqueous slurry, and a convenient way of adding it is in the form of a slurry in the salt solution.

With reference to the weight of water in the foam to which the magnesium oxide is added, the weight of the magnesium oxide is preferably about 100–300% by weight, more preferably about 150% by weight. Based on the weight of the foam to which it is added, the weight of the magnesium oxide is about 168–276% by weight, preferably about 184% by weight.

FILLER

A wide variety of materials can be used as filler. Sawdust, wood chips, talc, stone dust, quartz powder, kieselguhr, asbestos, sand, paper fiber, paper meal, cork dust and cork meal are all highly suitable. The use of a filler is not essential to the invention. Foamed cement according to the present invention but without the filler is a useful product. However, use of a filler is preferred. When used, the filler should not exceed preferably about 120% by weight of the magnesium oxide, more preferably about 100%, that is, the magnesium oxide and filler are preferably present in about equal weight ratios.

WATER

As indicated above, an important feature of the present invention is the possibility of using relatively small quantities of water in the formation of foamed cement according to the present invention, with the result that a foamed cement is produced which is quite firm even when wet. As a result, foamed cements according to the present invention are useful in the construction of plaster ceilings directly on the job site and have other uses not possible with foamed magnesia cements according to the prior art.

The water present in the final cement after foaming and the admixture of salt and magnesia and any filler will ordinarily be only the water of the bituminous dispersion prior to foaming plus the water of the salt solution. This will be present in the final product prior to setting in an amount of preferably about 100–300% by weight of the magnesium oxide, more preferably about 150%.

PROCEDURE

Aqueous bitumen emulsion and foaming agent are stirred into water, and this mixture is then foamed by stirring comprising violent agitation until a stable foam is formed. The metal salt in aqueous solution may then be added to the foam with continuous stirring, as are also the magnesium oxide and fillers. These latter three ingredients can be introduced simultaneously or separately, it being somewhat more convenient to add the salt first and then the magnesium oxide and fillers. The salt can be added prior to foaming, it then being desirable to use somewhat more foaming agent than when the salt is added after foaming.

After completion of the mixture, it is preferred to subject the foamed wet cement to an intensive heating of short duration, preferably above about 175° F. for not more than one hour. Preferably, infrared radiation is used.

After the foamed cement has set, the final product is found to be quite light in weight due to the fact that it suffers only very little collapse during hardening but is still strong and little inclined to chip, crack, abrade or powder. It is also found that the product is unexpectedly highly water resistant, so that it is seen that the bitumen has played the unique dual role of providing a stable foam to which magnesium oxide can be added without fear of collapse, and also of waterproofing the product to a remarkable and unpredictably high degree.

In order to enable those skilled in this art to practice the invention, the following illustrative examples are given:

*Example I*

A quantity of foamed magnesia cement was prepared from the following ingredients:

(a) Magnesium chloride solution, 20° Bé __liters__ 1.5
(b) Stable bitumen emulsion, "Colas Cold Asphalt," containing 55.7% bitumen and having a viscosity at 20° C. of 6.6 seconds through a 4 mm. nozzle, the bitumen itself having a specific gravity at 25° C. of 1.0, a softening point by the ring-and-ball method of 44°–54° C., a maximum paraffin weight of about 2%, and a loss of weight of 163° C. over 5 hours of about 1–1.5% _____mls__ 40
(c) Foaming agent of 55% ammonium butylnaphthalene sulphonate and 45% polymethylmethacrylate _____mls__ 20
(d) Magnesium oxide _____kgs__ 1.5
(e) Sawdust _____liters__ 2

These ingredients were mixed in the above order, the mixture being violently agitated after addition of the foaming agent and prior to addition of the magnesium oxide and sawdust filler, thereby to work up a stable foam, into which the magnesium oxide and sawdust filler were subsequently folded with more gentle stirring. This mixture was cast into three prisms, one of which was 16 x 4 x 4 cms., another of which was a cube 10 cms. on a side, and the third of which was a plate of 30 x 30 x 2.5 cms. After the samples had set and had been dried at a temperature of 105° C. until the weight remained constant, the average specific gravity was found to be 0.397.

In order to determine the effect of changing the order in which the ingredients were added, a further quantity of cement was made up from exactly the same proportions of the same ingredients as recited above, the only difference being that the magnesium oxide was added before the foaming agent and before the foaming step, rather than after the foaming step as in the initial procedure.

Three prisms of the same dimensions were again cast with the resulting foamed cement, and after casting and drying, these were found to have an average specific gravity of 0.699.

Still another test to determine the result of altering the sequence of the steps was performed with exactly the same mixture of exactly the same ingredients, except that they were combined in the order (a)–(d)–(e)–(b)–(c) and then foamed, that is, all the ingredients were combined and foaming was performed as the last step on the mixture including both the magnesium oxide and the sawdust. After casting into the same three prisms and setting and drying as above, the three samples were found to have an average specific gravity of 0.776.

It is therefore obvious that by far the lowest density is obtained by adding the magnesium oxide only after the stable foam is formed, and that if the magnesium oxide is added before the foam is formed, then the density of the product is greatly increased, but not so much as if the filler is also added before the foam is formed.

The water absorption of these three samples was next tested, it being known that as a general rule, volume percent water absorption varies inversely as density. In other words, it would be expected that the first group of test specimens would absorb the most water per unit volume, followed in order by the second and third group of specimens which have progressively greater density and therefore predictably progressively lower water absorption per unit volume.

Actually, however, the results of water absorption were dramatically different from what could be expected. In the following table, the first column represents the number of days during which the specimens were immersed in water, the second column represents the average volume percent water absorption of the first group of three specimens, in which magnesium oxide was added after foam formation. The next column represents the average volume percent water absorption of the second group of samples in which magnesium oxide was added prior to foam formation; while the last column is the average volume percent water absorption for the third group of samples in which magnesium oxide and sawdust were both added prior to foam formation.

| Days Immersion | First Specimens | Second Specimens | Third Specimens |
| --- | --- | --- | --- |
| 1 | 36.3 | 49.9 | 37.1 |
| 2 | 37.9 | 51.1 | 36.8 |
| 3 | 38.0 | 51.1 | 39.0 |
| 4 | 38.3 | 51.1 | 39.8 |
| 5 | 38.9 | 51.8 | 41.0 |
| 6 | 38.9 | 52.3 | 41.3 |

As would be expected in the case of the second and third specimens, the water absorption per unit volume of the third or densest group, having a specific gravity of 0.776, is less than for the second group having a specific gravity of 0.699. But for the first group, having by far the lowest specific gravity of all, 0.397, the water absorption per unit volume is even less than for the densest specimens! The very reverse would be predictable, for it would be expected that such a low density as in the first group of specimens would result in a far higher unit volume water absorption than for either of the other two groups of specimens. Thus, these tests show that when a bitumen dispersion is foamed prior to the addition of magnesium oxide in the formation of a foamed cement according to the present invention, not only is the density dramatically lower, but also the water absorption per unit volume is enormously lower than would be predicted and indeed is the very reverse of what could be expected relative to comparable samples produced by methods other than the present invention. The heart of the present invention is thus demonstrated, as indicated above, to be the addition of the magnesium oxide after foam formation rather than prior to foam formation.

Example II

To compare the results of the present invention with results obtained from the practice of the prior art according to Denning U.S. Patent No. 2,598,981, the following experiments were performed:

A mixture according to the present invention was made up having the following ingredients:

| | | |
|---|---|---|
| Water | mls | 38 |
| Bitumen dispersion as in Example I | mls | 23 |
| Foaming agent as in Example I | mls | 46 |
| Ferrous sulphate solution 24° Bé | mls | 750 |
| Magnesium oxide | mls | 350 |
| Sawdust | liters | 2.3 |

Foaming was conducted after addition of the foaming agent and prior to addition of the ferrous sulphate and magnesia and sawdust. The foamed cement was cast and dried and tested for water absorption by volume, which was found to be 10% after 22 hours.

For comparative purposes, a xylolith mixture according to the Denning patent was made, having the following composition:

| | | |
|---|---|---|
| Magnesium chloride solution 22° Bé | mls | 600 |
| Foaming agent of 54% alkylsulphonate, 36% alkylarylsulphonate, and 10% nonionic substances | mls | 6 |
| Magnesium oxide | mls | 370 |
| Sawdust | liters | 2 |

The ingredients of this Denning xylolith mixture were added in the above order, but it was not foamed until after addition of the magnesium oxide and prior to addition of the sawdust. The sawdust was then folded in with less violent agitation. After setting and drying, the water absorption was tested, and at the end of 22 hours was found to be 41% by volume.

This test of the Denning xylolith mixture, however, included no bitumen emulsion; so to test the effect of adding bitumen to Denning's xylolith, 23 mls. of bitumen emulsion described above were added to the Denning xylolith mixture prior to foaming, and test samples were cast and dried and tested for water absorption. In this last instance, however, the water absorption after 22 hours rose to 47% by volume. This is accounted for by the fact that the density of the cast specimens of Denning's xylolith was reduced by addition of the bitumen, so that the specimens then followed the expected pattern of showing increased water absorption for lower density.

In any event, the water absorption of the xylolith specimens was vastly greater than for those made according to the present invention.

Although certain preferred proportions of ingredients are recited above, those skilled in this art will understand that they are subject to wide variation, it being possible to vary the proportions considerably in accordance with certain conditions and operating procedures well known in this art.

From a consideration of the foregoing disclosure it will be obvious that all of the initially recited objects of the present invention have been achieved.

This application is a continuation-in-part of copending application Serial No. 569,960, filed March 7, 1956 and now abandoned.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a method of making a foamed magnesia cement by admixture of magnesium oxide and a water-soluble salt of a bivalent metal selected from the class consisting of magnesium sulphate and chloride, ferrous sulphate and chloride, and zinc sulphate and chloride, the improvement comprising the steps of making an aqueous mixture of dispersed bitumen and dissolved foaming agent, agitating the mixture intensively to form a stable foam, and adding magnesium oxide and said water-soluble salt to the foam while stirring.

2. A method as claimed in claim 1, the salt being ferrous sulphate.

3. A method as claimed in claim 1, the bitumen being present in an amount about 1–20% by weight of the magnesium oxide.

4. A method as claimed in claim 1, the bitumen being present in an amount about 6–7% by weight of the magnesium oxide.

5. A method as claimed in claim 1, water being present in an amount about 100–300% by weight of the magnesium oxide.

6. A method as claimed in claim 1, water being present in an amount about 150% by weight of the magnesium oxide.

7. A method as claimed in claim 1, the salt being present in an amount about 20–60% by weight of the magnesium oxide.

8. A method as claimed in claim 1, the salt being present in an amount about 30% by weight of the magnesium oxide.

9. A method as claimed in claim 1, the foaming agent being present in an amount about 2–3% by weight of the magnesium oxide.

10. A method as claimed in claim 1, the foaming agent being present in an amount about 2.5% by weight of the magnesium oxide.

11. A method as claimed in claim 1, and adding a filler to the foam while stirring.

12. A method as claimed in claim 11, the filler being present in an amount not more than about 120% by weight of the magnesium oxide.

13. A method as claimed in claim 11, the filler being present in an amount about equal to the amount of magnesium oxide by weight.

14. A method as claimed in claim 1, the bitumen in said aqueous mixture prior to foaming being about 1–30% by weight of the water of said aqueous mixture.

15. A method as claimed in claim 1, the bitumen in said aqueous mixture prior to foaming being about 10% by weight of the water of said aqueous mixture.

16. A method as claimed in claim 1, the magnesium oxide being present in an amount about 168–276% by weight of the foam to which it is added.

17. A method as claimed in claim 1, the magnesium oxide being present in an amount about 184% by weight of the foam to which it is added.

References Cited in the file of this patent

UNITED STATES PATENTS

| | | |
|---|---|---|
| 2,172,076 | Wolfe et al. | Sept. 5, 1939 |
| 2,354,156 | Sucetti | July 18, 1944 |
| 2,598,981 | Denning | June 3, 1952 |

FOREIGN PATENTS

| | | |
|---|---|---|
| 145,394 | Australia | Feb. 25, 1952 |
| 1,037,944 | Germany | Aug. 28, 1958 |